United States Patent
Vitiello et al.

(10) Patent No.: US 11,924,252 B2
(45) Date of Patent: Mar. 5, 2024

(54) METHODS AND DEVICES FOR TRIGGERING LAWFUL INTERCEPTION

(71) Applicant: Telefonaktiebolaget LM Ericsson (PUBL), Stockholm (SE)

(72) Inventors: Antonio Vitiello, Pompei (IT); Daniele Gaito, Naples (IT); Enrico De Luca, Caserta (IT); Lorenzo Giuseppe Elisio, Salerno (IT); Mariano Russo, Naples (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 86 days.

(21) Appl. No.: 17/619,478

(22) PCT Filed: Jun. 25, 2019

(86) PCT No.: PCT/SE2019/050608
§ 371 (c)(1),
(2) Date: Dec. 15, 2021

(87) PCT Pub. No.: WO2020/263135
PCT Pub. Date: Dec. 30, 2020

(65) Prior Publication Data
US 2022/0311807 A1 Sep. 29, 2022

(51) Int. Cl.
*H04L 9/40* (2022.01)
(52) U.S. Cl.
CPC .................... *H04L 63/30* (2013.01)
(58) Field of Classification Search
None
See application file for complete search history.

(56) References Cited

U.S. PATENT DOCUMENTS

| | | | |
|---|---|---|---|
| 2014/0010228 A1* | 1/2014 | Maione | H04L 63/30 370/352 |
| 2016/0112261 A1* | 4/2016 | Amato | H04L 41/0869 709/220 |
| 2017/0085704 A1* | 3/2017 | Rao | H04L 65/1096 |

OTHER PUBLICATIONS

ETSI GR NFV-SEC 011 v1.1.1, Network Functions Virtualisation (NFV); Security; Report on NFV LI Architecture—Apr. 2018.
ETSI GS NFV-SEC 002 v1.1.1, Network Functions Virtualisation (NFV); NFV Security; Cataloguing security features in management software—Aug. 2015.
ETSI GS NFV-SEC 004 v1.1.1, Network Functions Virtualisation (NFV); NFV Security; Privacy and Regulation; Report on Lawful Interception Implications—Sep. 2015.
ETSI GS NFV-SEC 012 v3.1.1, Network Functions Virtualisation (NFV), Release 3; Security; System architecture specification for execution for sensitive NFV components—Jan. 2017.

(Continued)

*Primary Examiner* — Brandon Hoffman
(74) *Attorney, Agent, or Firm* — BAKER BOTTS L.L.P.

(57) ABSTRACT

Methods and network devices implement a lawful interception (LI) trigger control function as an LI target handler and a modified trigger control function. A generic LI triggering interface enables the modified trigger control function to query the LI target handler regarding whether entities using a network function instance are in a target list. The LI target handler has to meet the LI security requirements, but the modified trigger control function does not have to meet such requirements.

20 Claims, 8 Drawing Sheets

(56) References Cited

OTHER PUBLICATIONS

ETSI TR 101 567 v1.1.1, Lawful Interception (LI); Cloud/Virtual Services for Lawful Interception (LI) and Retained Data (RD)—Jan. 2016.
ETSI TS 133 108 v14.0.0, Universal Mobile Telecommunications System (UMTS); LTE; 3G security; Handover interface for Lawful Interception (LI) (3GPP TS 33.108 version 14.0.0 Release 14)—Apr. 2017.
PCT International Search Report issued for International application No. PCT/SE2019/050608—dated Feb. 20, 2020.
PCT Written Opinion of the International Searching Authority issued for International application No. PCT/SE2019/050608—dated Feb. 20, 2020.

* cited by examiner

METHODS AND DEVICES FOR TRIGGERING LAWFUL INTERCEPTION

PRIORITY

This nonprovisional application is a U.S. National Stage Filing under 35 U.S.C. § 371 of International Patent Application Serial No. PCT/SE2019/050608 filed Jun. 25, 2019 and entitled "METHODS AND DEVICES FOR TRIGGERING LAWFUL INTERCEPTION" which is hereby incorporated by reference in its entirety.

TECHNICAL FIELD

Embodiments of the subject matter disclosed herein relate to triggering lawful interception (LI). More precisely, the LI triggering control function is split into two logical entities connected via a generic LI triggering interface (GLITI).

BACKGROUND

In network environments, well-known interfaces (such as, X1, X2, X3, HI1, HI2, HI3) have been conventionally employed for receiving and responding to Lawful Interception (LI) production requests.

Figure 1:
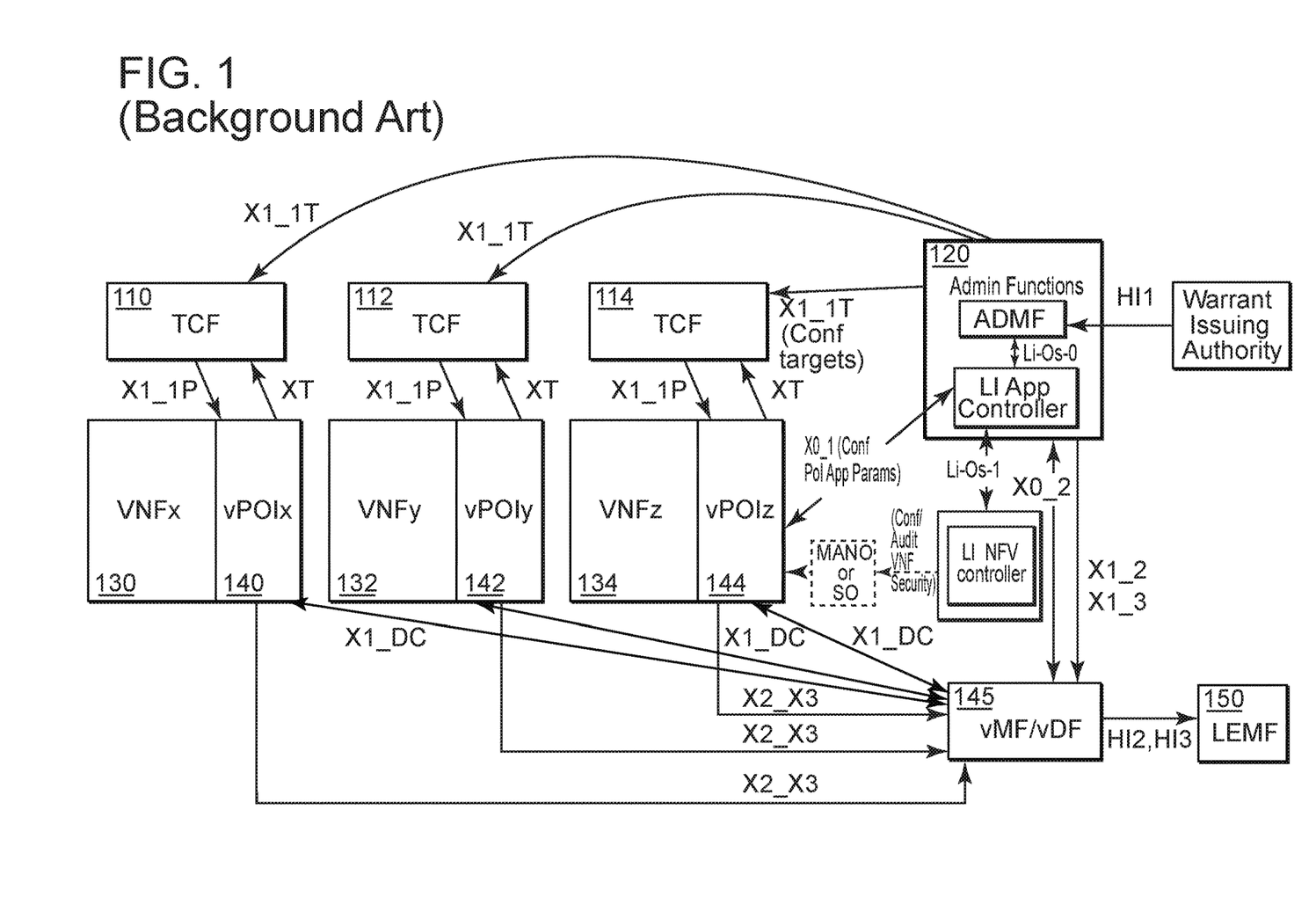
FIG. 1 illustrates a conventional virtualized LI architecture.

FIG. 1 (which is similar to FIG. 6.3.1-1 in the European Telecommunications Standards Institute (ETSI) Group Report (GR) on "Network Functions Virtualization (NVF); Security; Report on NVF LI Architecture," published in April 2018) illustrates a conventional virtualized LI architecture. Some of the functional entities relevant to LI are: Warrant Issuing Authority (which is administrative function of Lawful Enforcement Agency, LEA), Point of Interception (POI), Triggering Control Function (TCF), Mediation and Delivery Function (MF/DF), Administrative Function (ADMF) and Law Enforcement Monitoring Facility (LEMF, which is also part of LEA). The term "virtual" indicates cloud execution, that is, platform- and location-independent.

POIs such as 140, 142, 144 in FIG. 1 (here "v" stands for virtual and it is omitted hereinafter) are interception functions that detect target communications, derive the intercept-related information (IRI) or communications content (CC) from the target communications and deliver IRI and/or CC to MF/DF 145. A POI may be embedded within a virtual network function (VNF) such as 130, 132 or 134 in FIG. 1 or be separate from the VNF with which it is associated. POIs may directly detect which communications need to be intercepted or may detect the target communications based on a trigger received from an associated TCF as in FIG. 1.

TCF is an LI-specific virtual network function that fully meets LI security requirements (as, for example, set forth in ETSI, Group Specification, GS, on "Network Functions Virtualization (NVF) Release 3; Security; System architecture specification for execution of sensitive NVF components" published in January 2017) for holding and processing sensitive LI information (e.g., target lists). Security requirements means trusted hardware, software and process to provide an equivalent level of LI capability and security to that of an "on-switch" conventional hardware implementation.

FIG. 1 illustrates TCFs 110, 112 and 114 that receive a target list from ADMF 120 over X1_1T interfaces, which are X1_1 standard interfaces used by the ADMF to provide the TCFs with target lists and other information required to perform and maintain interception. TCFs are responsible for processing signaling session information for all communications (received over XT interfaces) from the VNFs (130, 132, 134) in which the POIs (140, 142, 144) are embedded, respectively. When a TCF identifies communications matching the target list provided by the ADMF, the TCF informs the respective POI (via x1_1P interface that is also an X1_1 standard interface) to start intercepting specific communications and handing them over to LEMF 150. Ongoing monitoring is not stopped if the warrant is removed (i.e., TCF does not inform the POI that the target has been removed). When another start event involving the extarget occurs, TCF indicates ex-target not monitored.

A trusted computing base (TCB) that meets LI security requirements is necessary to host TCF when the POI is embedded in the VNF. Therefore, the whole cloud infrastructure has to satisfy such demanding security requirements, with negative impact on costs and ease of use.

The above-described conventional approach has the following disadvantages. Multiple TCFs are needed for different POI types and for different network traffic domains. A large volume of data is exchanged over an XT interface because a copy of all signaling or other service access control information for all communications visible to the POI is sent through it. The complete triggering check (i.e., round-trip time XT+X1_1P) takes a long time. The TCF must satisfy demanding security requirements for LI target storage. Multiple connections have to be established to ADMF. Target list duplication in more than one network node hosting TCFs causes related synchronization and security problems. When the POI is not embedded in the VNF, only TCF and MF/DF need to be deployed in a trusted computing base, TCB. However, the same TCF-related issues described above are present. This list of disadvantages is not exhaustive.

There is an unfulfilled need to develop methods and devices for alleviating the above disadvantages of conventional triggering of LI.

To ease understanding, abbreviations used in this document and their explanations are listed below.

ADMF Administrative Function
CAPEX Capital Expenditure
CC Communications Content
DF Delivery Function
GLITI Generic LI Triggering Interface
HW Hardware
IRI Intercept-Related Information
JSON JavaScript Object Notation
LEA Lawful Enforcement Agency
LEMF Law Enforcement Monitoring Facility
LI Lawful Interception
LITH LI Target Handler
LRPG Lawful Interception Routing Proxy Gateway
MANO Management and Orchestration
MF Mediation Function
NE Network Element
NFI Network Function Instance
NFV Network Function Virtualization
NW Network
POI Point of Interception
SO Security Orchestrator
TCB Trusted Computing Base
TCF Triggering Control Function
TLH Target List Handler
VNF Virtual Network Function

SUMMARY

In methods and devices according to various embodiments, the TCF is split into two functional entities with a generic LI triggering interface there-between. The functional entities are LI target list handling, LITH, and a modified TCF, mTCF.

According to an exemplary embodiment, there is a method for triggering LI in a communications network. The method includes implementing a TCF as two entities: (1) an LITH, which meets LI security requirements for holding and processing sensitive information, maintains an LI target list, and (2) an mTCF, which does not have to meet the LI security requirements, triggers a POI linked to a NFI to start intercepting specific target's communications occurring when the NFI is executed. The method further includes providing a GLITI between the LITH and the mTCF to enable the mTCF to interrogate the LITH regarding whether an entity using the NFI is a specific target of LI.

According to another embodiment, there is a readable recording medium storing executable codes that when executed by one or more devices of a communication network operator make the one or more devices to perform a method for triggering LI. The method includes implementing a TCF as two entities: (1) an LITH, which meets LI security requirements for holding and processing sensitive information, maintains an LI target list, and (2) an mTCF, which does not have to meet the LI security requirements, triggers a POI linked to a NFI to start intercepting specific target's communications occurring when the NFI is executed. The method further includes providing a GLITI between the LITH and the mTCF to enable the mTCF to interrogate the LITH regarding whether an entity using the NFI is a specific target of LI.

According to another embodiment there is network operator device employed in LI in a network. The device has a network interface configured to intermediate communication with other network devices, and a processor connected to the network interface. The processor is configured to perform at least one of (1) an LITH, which meets LI security requirements for holding and processing sensitive information, maintains an LI target list, and (2) an mTCF, which does not have to meet the LI security requirements, triggers a POI linked to a NFI to start intercepting specific target's communications occurring when the NFI is executed. The LITH and the mTCF communicate via a GLITI that enables the mTCF to interrogate the LITH regarding whether an entity using the NFI is a specific target of LI.

According to yet another embodiment, there is a network device for triggering LI, the network device including three modules. A first module is configured to enable communication with other network devices. A second module is configured to operate as a first function among an LITH and an mTCF. A third module is configured to provide a GLITI enabling the first function to communicate with a second function different from the first function, the second function being also the LITH or the mTCF.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements within the scope of the claims.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 2:
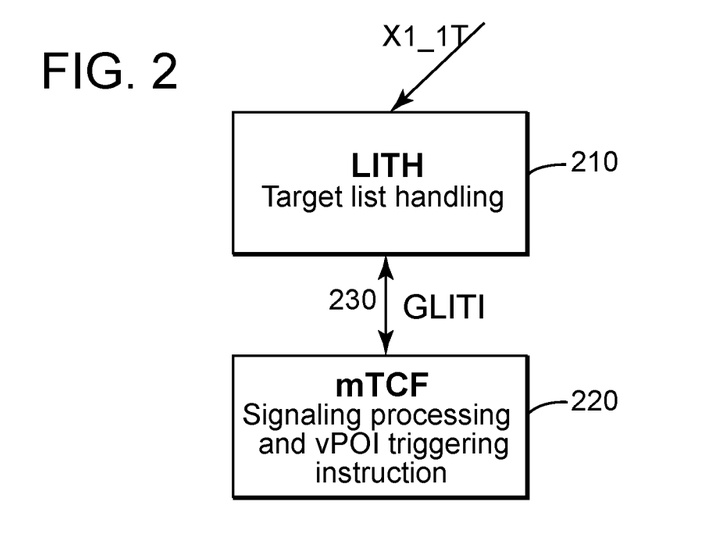
FIG. 2 illustrates implementing TCF as a LITH and an mTCF with a GLITI there-between according to an embodiment.

As illustrated in FIG. 2, conventional TCF is replaced by LITH 210 communicating with mTCF 220 (which is tied to a specific VNF's POI) via GLITI 230. The LITH may be common for different POI types and for different network traffic domains. According to this approach, only LITH (not also mTCF 220) must satisfy the security requirements for LI-sensitive information storage. This approach boosts flexibility in network design and the choice of deployment options.

LITH 210 performs the target list-handling function. Similar to the conventional TCF, LITH receives the full target list (or only the relevant portion) and POI information from the ADMF via an X1_1T interface. LITH 210 informs mTCF 220 via GLITI when identities associated with VNF communications match the ones in the target list. LITH has to meet LI security requirements because it stores the target list.

Figure 3:
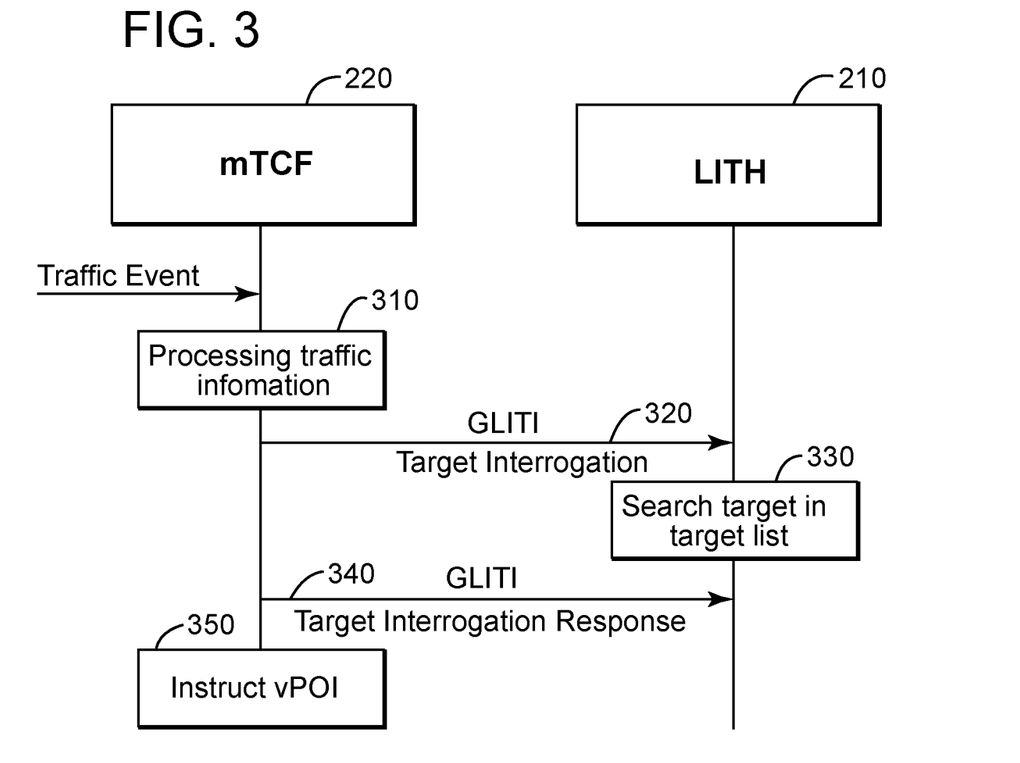
FIG. 3 represents a scenario according to an embodiment.

The other functional entity, mTCF 220, processes signaling session information for all communications visible to the NFI in which the POI is embedded. FIG. 3 represents a scenario (time flowing downward) according to an embodiment. When a traffic event (such as, an access registration, a call, an SMS, location updating or any other event involving a user of the telecommunication network) occurs, mTCF 220 processes traffic information at 310 to identify the user(s) which are potential target(s). If at least one new potential target (i.e., there is no current LI of one of the users) is identified at 310, mTCF 220 performs a target query. That is, mTCF 220 sends a target interrogation message via GLITI to LITH 210 at 320. In one embodiment, the target interrogation message includes transaction information and target identity information. The transaction information identifies the query. The target identity information identifies the potential target(s). For example, the target information may include identity key information, the type of entity, value and additional information. Optionally, the target interrogation message may also include VNF information.

In response, LITH 210 returns via GLITI a target interrogation response at 340 after determining, at 330, whether the potential target(s) is (are) in the target list. The target interrogation response may include transaction information from the target interrogation message and interrogation result information (e.g., a result for each identity key in the target identity information). If the target interrogation response indicates that a target is in the target list, mTCF 220 informs the POI (not shown in FIG. 3) at 350 to start intercepting specific communications and to hand them (e.g., IRI and/or CC) over to reach LEMF.

The GLITI used for LITH/mTCF communication may be a generic interface based on open standard file format (e.g., JSON).

Figure 4:
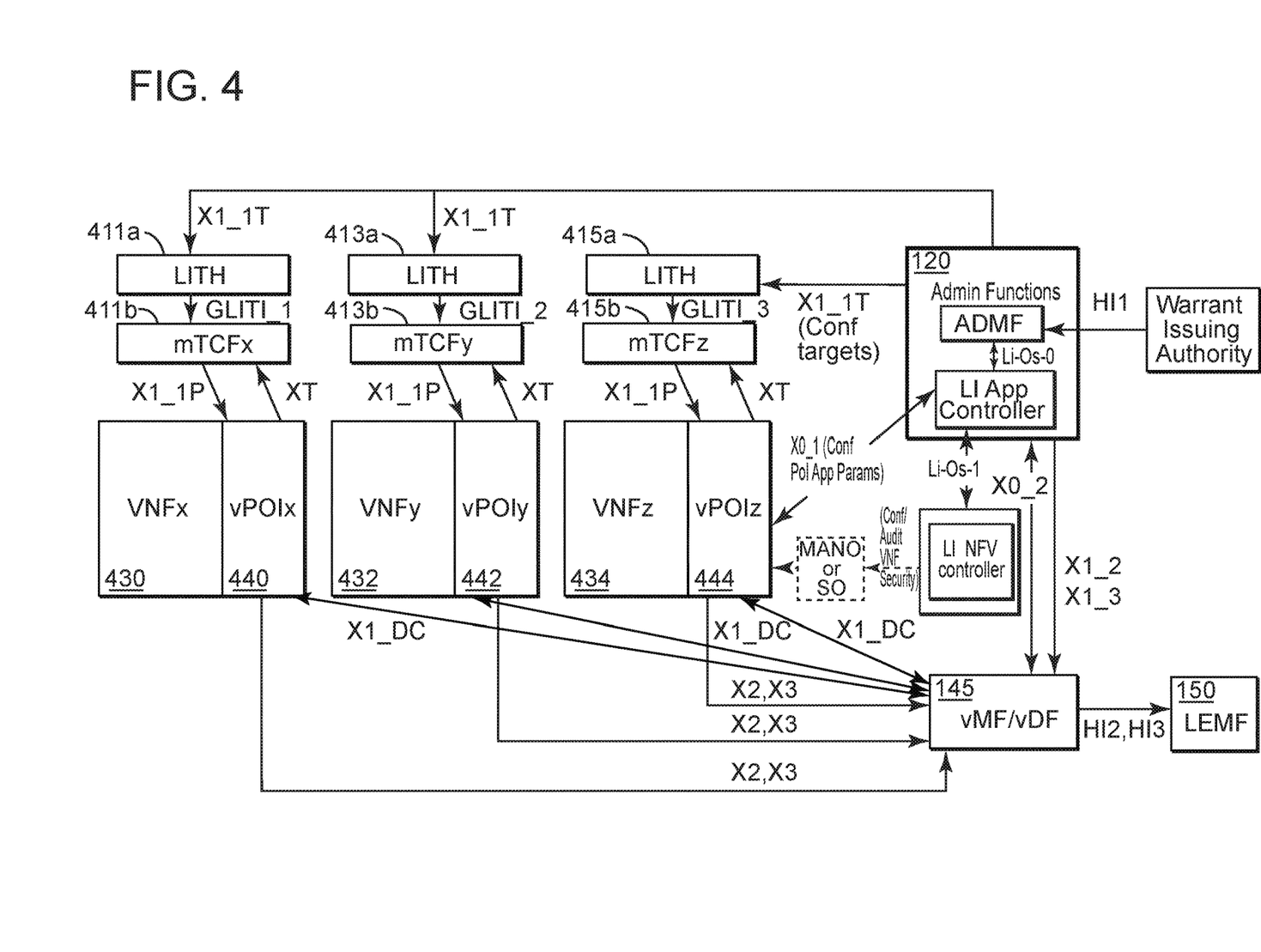
FIGS. 4-6 illustrate virtualized LI architectures according to various embodiments.
Figure 5:
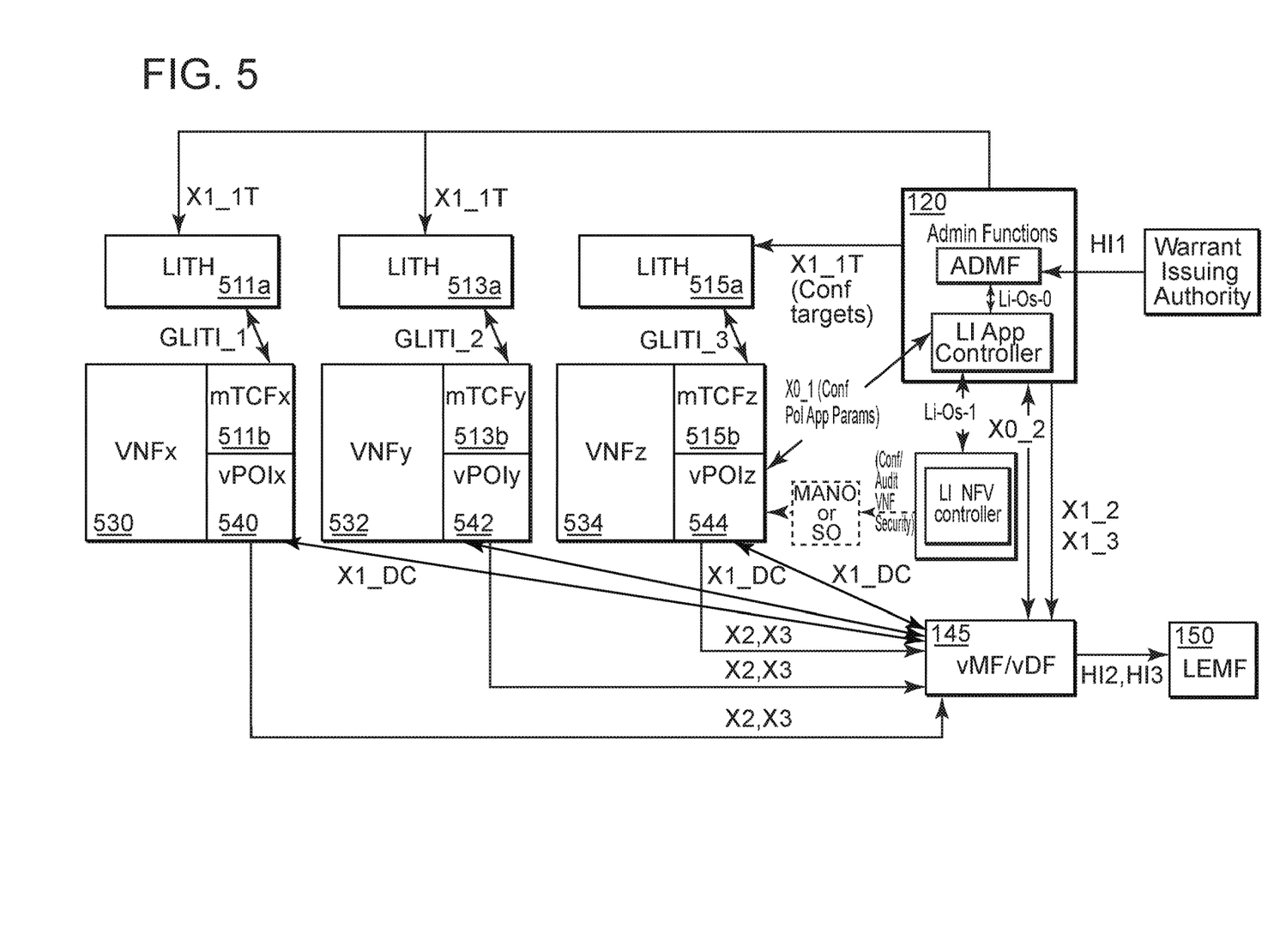
Figure 6:
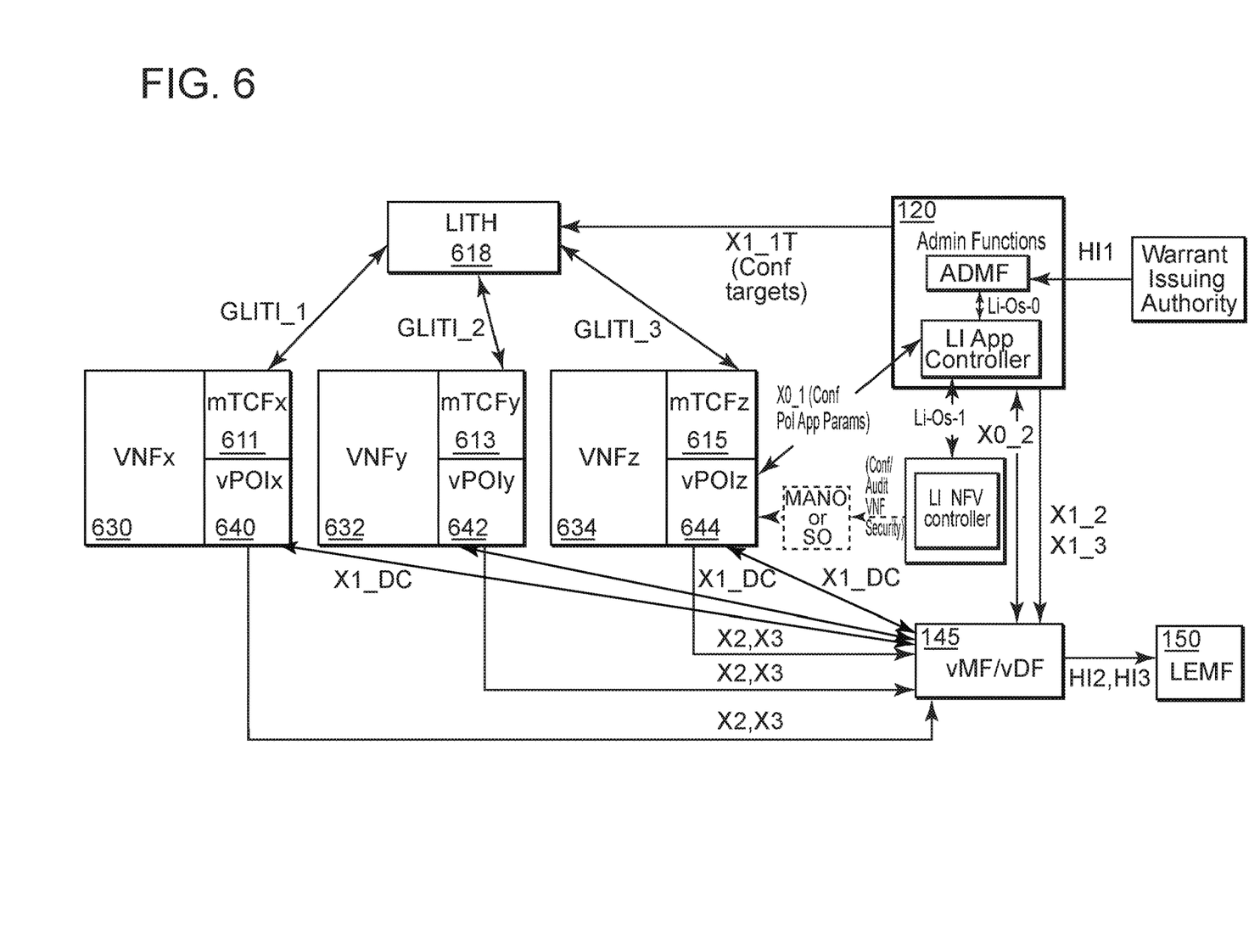

FIGS. 4-6 illustrate virtualized LI architectures embodying the above-described approach. In FIG. 4, LITHs 411a, 413a and 415a and mTCFs 411b, 413b and 415b connected via GLITI_1, GLITI_2 and GLITI_3, respectively, replace TCFs 110, 112 and 114 in FIG. 1. LITHs may have the same type for all VNFs.

In FIG. 5, LITHs 511a, 513a and 515a and mTCFs 511b, 513b and 515b connected via GLITI_1, GLITI_2 and GLITI_3, respectively, replace TCFs 110, 112 and 114 in FIG. 1. Note that mTCFs 511b, 513b and 515b are embedded in VNFs to avoid exchanging large amounts of data between network devices.

In FIG. 6, mTCFs 611, 613 and 615 are connected to a centralized LITH 616 via GLITI_1, GLITI_2 and GLITI_3, respectively, replacing TCFs 110, 112 and 114 in FIG. 1. As in FIG. 5, mTCFs 611, 613 and 615 are embedded in VNFs. The centralized LITH allows deployment of a single copy of the target list, thereby reducing security vulnerability (because the monitored target list is held in a single device). This centralized LITH also reduces operation and maintenance in terms of less target list synchronization and fewer ADMF communications. It also simplifies LI functions and eases Life Cycle Management when a new network service is added because it avoids LI target list proliferation. Less hardware (HW) means also smaller CAPEX for HW needs.

In FIGS. 4-6, the mTCF(s) may be performed by a different hardware device(s) than a hardware device hosting the LITH(s) (e.g., 411a is performed on a different entity than 411b, etc., 511a is performed on a different entity than 511b, etc., 616 is performed on a different entity than 611, 613 and 615).

Figure 7:
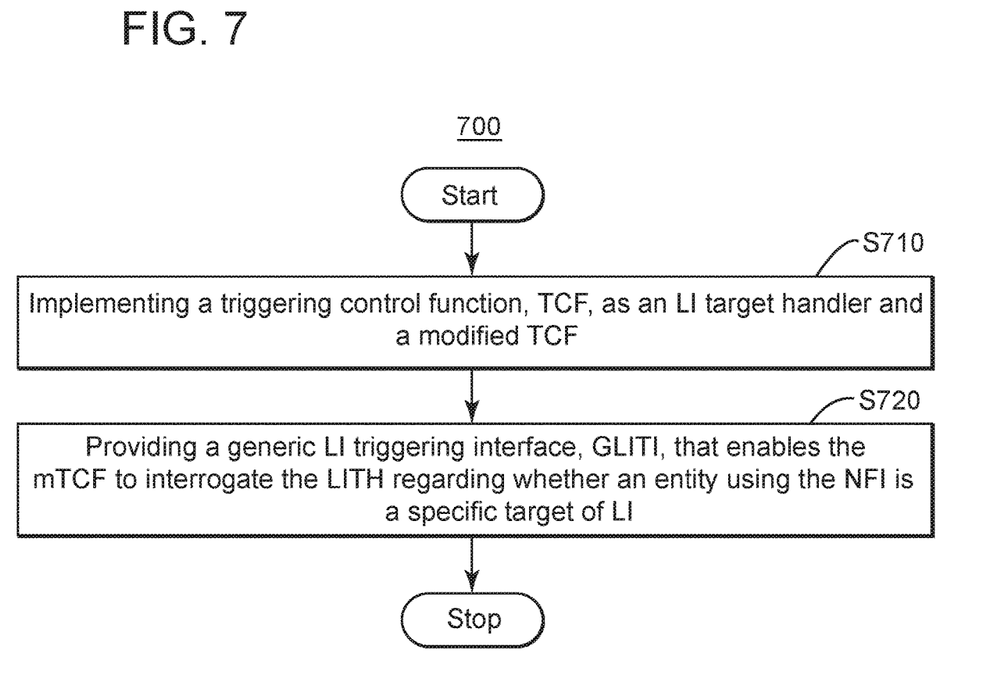
FIG. 7 is a flowchart of a method according to an embodiment.

FIG. 7 is a flowchart of a method 700 for triggering lawful interception, LI, in a communication network according to an embodiment. Method 700 includes implementing a triggering control function as a LITH and an mTCF at S710. The LITH, which meets LI security requirements for holding and processing sensitive information, maintains an LI target list. The mTCF, which does not have to meet LI security requirements, triggers a POI linked to a network function instance, NFI, to start intercepting a specific target's communications occurring when the NFI is executed.

Method 700 further includes providing a GLITI between the LITH and the mTCF at S720. The GLITI enables the mTCF to interrogate the LITH regarding whether an entity using the NFI is a specific target of LI. The mTCF may process traffic events related to the NFI to identify the entity. Upon receiving an identifier of the entity in a target interrogation message from the mTCF via the GLITIs, the LITH may determine whether the identifier is in the LI target list and return a target interrogation result accordingly.

The target interrogation message may include transaction information identifying a current target interrogation and the identifier of the entity. The target interrogation message may also include information about the NFI.

The target interrogation result includes transaction information and indicates that the entity is the specific target of LI if determined that the identity is in the LI target list. Note that both the target interrogation message and the target interrogation result may support plural queries (for plural entities).

The mTCF and the LITH may be executed on different hardware devices. However, the mTCF and the POI may be embedded in the NFI. The LITH may be connected to more than one mTCF (the mTCFs do not have to meet LI security requirements).

Figure 8:
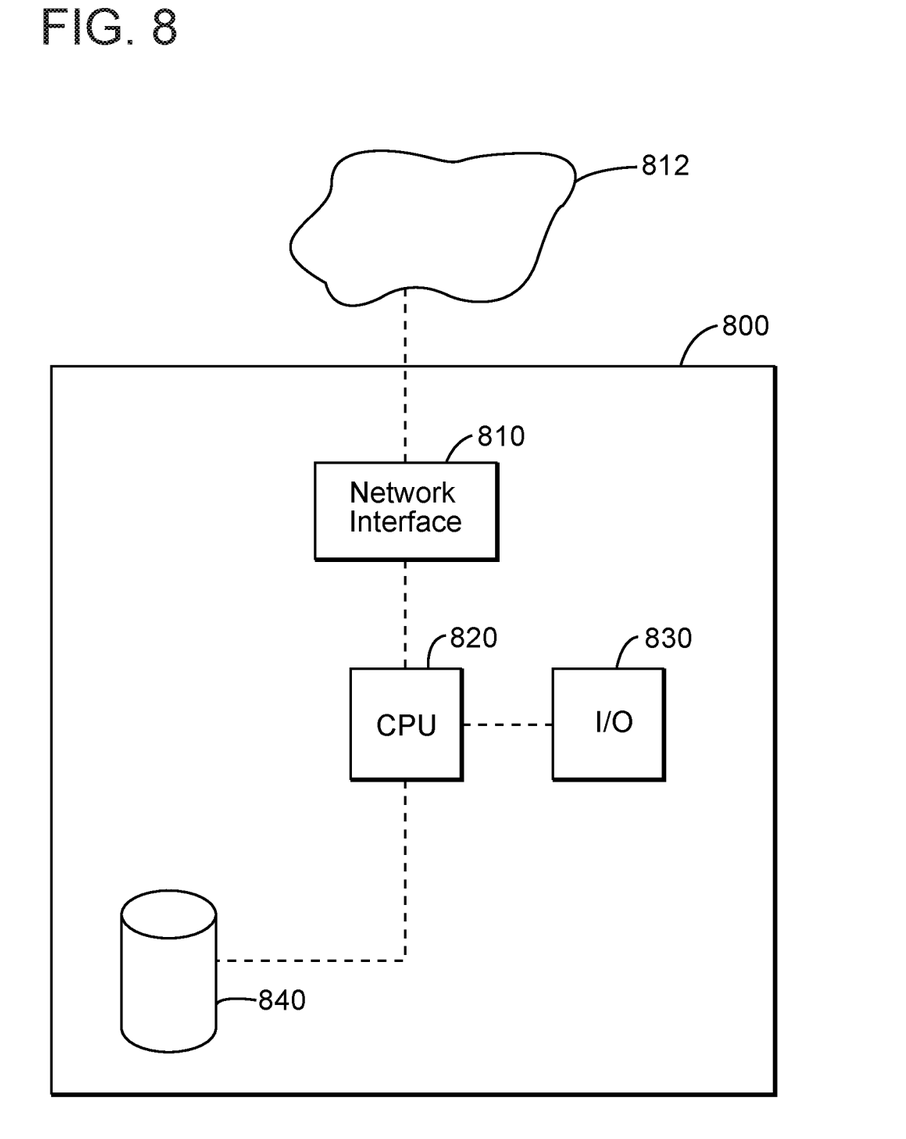
FIG. 8 is schematic diagram of a device configured to control LI triggering according to an embodiment.

FIG. 8 is schematic diagram of a network device 800 configured to perform at least one of LITH and mTCF according to an embodiment. The network device 800 has a network interface 810 configured to intermediate communication with other network devices, and a central processing unit 820 including one or more processors connected to the interface. Central processing unit 820 is configured to perform one of a LITH and an mTCF. The LITH has to meet LI security requirements for holding and processing sensitive information as it maintains an LI target list. The mTCF does not have to meet LI security requirements, but triggers a POI linked to an NFI to start intercepting a specific target's communications occurring when the NFI is executed. The LITH and the mTCF communicate via a generic LI triggering interface, GLITI, which enables the mTCF to interrogate the LITH regarding whether an entity using the NFI is a specific target of LI. Network device 800 may include an input/output interface 830 as desired, necessary or provided by equipment manufacturer.

The network operator device 800 also includes a memory 840 storing executable codes that, when executed by one or more devices of a communication network operator, make the one or more devices perform the method described in this section.

Figure 9:
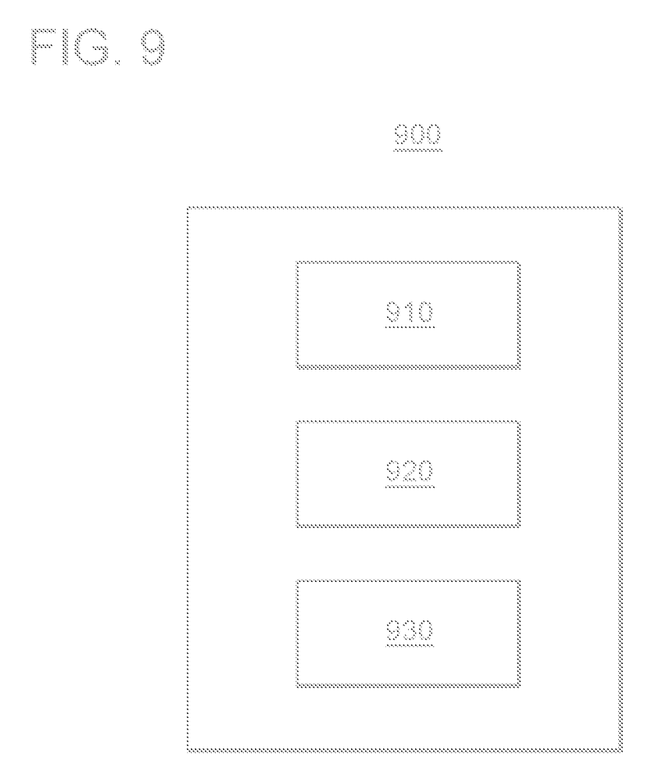
FIG. 9 is a schematic diagram of another device configured to control LI triggering, according to yet another embodiment.

FIG. 9 is a schematic diagram of a device 900 configured to control LI triggering. The device 900 includes a first module 910 configured to enable communication with other network devices, a second module 920 configured to operate as a first function among an LITH and an mTCF, and a third module 930 configured to provide a GLITI enabling the first function to communicate with a second function different from the first function, the second function being also the LITH or the mTCF.

The disclosed embodiments provide methods and devices for triggering LI. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments describe herein, e.g., systems and methods associated with charging in an IoT environment, may take the form of a computer program product stored on a computer-readable storage medium having computer-readable instructions embodied in the medium. For example, FIG. 8 depicts an electronic storage medium 840 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for triggering lawful interception, LI, in a communication network, the method comprising:
   implementing a triggering control function, TCF, as two entities:
   an LI target handler, LITH, which meets LI security requirements for holding and processing sensitive information, maintains an LI target list, and
   a modified TCF, mTCF, which does not have to meet the LI security requirements, triggers a point of interception, POI, linked to a network function instance, NFI, to start intercepting specific target's communications occurring when the NFI is executed; and
   providing a generic LI triggering interface, GLITI between the LITH and the mTCF to enable the mTCF to interrogate the LITH regarding whether an entity using the NFI is a specific target of LI.

2. A computer readable recording medium storing executable codes that when executed by one or more devices of a communication network operator make the one or more devices to perform a method for triggering lawful interception, LI, the method comprising:
   implementing a triggering control function, TCF, as two entities:
   an LI target handler, LITH, which meets LI security requirements for holding and processing sensitive information, maintains an LI target list, and
   a modified TCF, mTCF, which does not have to meet the LI security requirements, triggers a point of interception, POI, linked to a network function instance, NFI, to start intercepting specific target's communications occurring when the NFI is executed; and
   providing a generic LI triggering interface, GLITI between the LITH and the mTCF to enable the mTCF to interrogate the LITH regarding whether an entity using the NFI is a specific target of LI.

3. The computer readable recording medium of claim 2, wherein the mTCF processes traffic events related to the NFI to identify the entity.

4. The computer readable recording medium of claim 3, wherein, upon receiving an identifier of the entity in a target interrogation message from the mTCF via the GLITIs, the LITH, determines whether the identifier is in the LI target list, and returns a target interrogation result accordingly.

5. The computer readable recording medium of claim 4, wherein
   the target interrogation message includes transaction information identifying a current target interrogation, and the identifier of the entity, and
   the target interrogation result includes the transaction information and indicates that the entity is the specific target of LI if determined that the identity is in the LI target list.

6. The computer readable recording medium of claim 5, wherein
   the target interrogation message includes another identifier of another entity using the NFI, and
   the target interrogation result includes another indication as to whether the other entity is another specific target.

7. The computer readable recording medium of claim 2, wherein the mTCF is performed by a different hardware device than a hardware device hosting the LITH.

8. The computer readable recording medium of claim 2, wherein the mTCF is embedded in the NFI.

9. The computer readable recording medium of claim 2, wherein the LITH is connected to at least another mTCF that does not have to meet the LI security requirements and triggers another POI linked to another NFI to start intercepting specific target's communications occurring when the another NFI is executed.

10. A network operator device employed in lawful interception (LI) in a communication network, the device comprising:
    a network interface configured to intermediate communication with other network devices; and
    a processor connected to the network interface and configured to perform at least one of
    an LI target handler, LITH, that meets LI security requirements for holding and processing sensitive information and maintains an LI target list, and
    a modified trigger control function, mTCF, that does not have to meet the LI security requirements and triggers a point of interception, POI, linked to a network function instance, NFI, to start intercepting specific target's communications occurring when the NFI is executed,
    wherein the LITH and the mTCF communicate via a generic LI triggering interface, GLITI, that enables the mTCF to interrogate the LITH regarding whether an entity using the NFI is a specific target of LI.

11. The network operator device of claim 10, wherein the processor executes the mTCF is configured to process traffic events related to the NFI to identify the entity.

12. The network operator device of claim 10, further comprising a memory storing the LI target list,
    wherein the processor performs the LITH that, upon receiving an identifier of the entity in a target interrogation message from the mTCF via the GLITIs, determines whether the identifier is in the LI target list, and returns a target interrogation result accordingly.

13. The network operator device of claim 12, wherein
    the target interrogation message includes transaction information identifying a current target interrogation, and the identifier of the entity, and
    the target interrogation result includes the transaction information and indicates that the entity is the specific target of LI if determined that the identity is in the LI target list.

14. The network operator device of claim 13, wherein
    the target interrogation message includes another identifier of another entity using the NFI, and
    the target interrogation result includes another indication as to whether the other entity is another specific target.

15. The network operator device of claim 13, wherein the target interrogation message includes information about the NFI.

16. The network operator device of claim 10, wherein the processor performs only one of the two logical entities.

17. The network operator device of claim 10, wherein the mTCF is embedded in the NFI.

18. The network operator device of claim 17 wherein the POI is embedded in the NFI.

19. The network operator device of claim 10, wherein the LITH is connected to at least another mTCF that does not have to meet the LI security requirements and triggers another POI linked to another NFI to start intercepting specific target's communications occurring when the another NFI is executed.

20. The network operator device of claim 10, wherein the processor performs only one of the two logical entities and causes another network operator device to perform the other one of the two logical entities.

* * * * *